United States Patent
Dai et al.

(10) Patent No.: US 10,618,923 B2
(45) Date of Patent: Apr. 14, 2020

(54) PREPARATION METHOD OF PHOSPHAPHENANTHRENE-STRUCTURE REACTIVE FLAME RETARDANT AND APPLICATION THEREOF

(71) Applicant: XIAMEN UNIVERSITY, Xiamen, Fujian (CN)

(72) Inventors: Lizong Dai, Xiamen (CN); Chao Liu, Xiamen (CN); Guorong Cehn, Xiamen (CN); Jiamei Huang, Xiamen (CN); Yiting Xu, Xiamen (CN); Birong Zeng, Xiamen (CN); Wei'ang Luo, Xiamen (CN); Cohghui Yuan, Xiamen (CN); Kaibin He, Xiamen (CN); Xinyu Liu, Xiamen (CN)

(73) Assignee: XIAMEN UNIVERSITY, Xiamen, Fujian (CN)

( * ) Notice: Subject to any disclaimer, the term of this patent is extended or adjusted under 35 U.S.C. 154(b) by 0 days.

(21) Appl. No.: 16/463,735

(22) PCT Filed: Nov. 23, 2017

(86) PCT No.: PCT/CN2017/112584
§ 371 (c)(1),
(2) Date: May 23, 2019

(87) PCT Pub. No.: WO2018/095362
PCT Pub. Date: May 31, 2018

(65) Prior Publication Data
US 2019/0382427 A1 Dec. 19, 2019

(30) Foreign Application Priority Data
Nov. 23, 2016 (CN) .......................... 2016 1 1036541

(51) Int. Cl.
*C07F 9/6584* (2006.01)
*C08G 59/62* (2006.01)

(52) U.S. Cl.
CPC .......... *C07F 9/6584* (2013.01); *C08G 59/623* (2013.01)

(58) Field of Classification Search
CPC ........................... C07F 9/6584; C08G 59/623
See application file for complete search history.

(56) References Cited

U.S. PATENT DOCUMENTS 3,897,205 A  7/1975  Frank et al.

FOREIGN PATENT DOCUMENTS

| CN | 102134304 A | 7/2011 |
| CN | 102219806 A | 10/2011 |
| CN | 104231309 A | 12/2014 |
| CN | 104558684 A | 4/2015 |
| CN | 104844745 A | 8/2015 |
| CN | 106554483 A | 4/2017 |

OTHER PUBLICATIONS

Arlen, W. Frank et al. Aniline Derivatives of Tetrakis (Hydromethyl) Phosphonium Chloride. The Journal of Organic Chemistry. Dec. 31, 1972, pp. 2752-2755, vol. 37-17, 4 pages.

*Primary Examiner* — Jafar F Parsa
(74) *Attorney, Agent, or Firm* — Muncy, Geissler, Olds & Lowe, P.C.

(57) ABSTRACT

Disclosed are a phosphaphenanthrene-structure reactive flame retardant and an application thereof. The preparation method comprises: enabling 9,10-dihydro-9-oxa-10-phosphaphenanthrene-10-oxide (DOPO), p-hydroxy benzaldehyde (4-HBA), and 5-aminomethyl-1,3-diphenyl-1,3,5-diphosphonitryl heterocycles to react under a certain condition to obtain the reactive flame retardant with a benzene ring rigid structure containing polyhydroxy. Compared with an ordinary flame retardant, the phosphaphenanthrene-structure reactive flame retardant has the characteristics that polyfunctionality is achieved, the molecular structure is stable, the hydrolysis resistance is better, and less migration in epoxy resin, moreover, the flame retardant property of the epoxy resin can be remarkably improved.

7 Claims, 2 Drawing Sheets

PREPARATION METHOD OF PHOSPHAPHENANTHRENE-STRUCTURE REACTIVE FLAME RETARDANT AND APPLICATION THEREOF

TECHNICAL FIELD

The invention relates to a flame retardant, in particular to a preparation method of phosphaphenanthrene-structure reactive flame retardant and application thereof.

BACKGROUND ART

Since Castan and Greenlee invented epoxy resin at the same time in 1936, epoxy resin has been widely used in almost all aspects of social life, such as transportation, infrastructure construction, ships and oceans, astronautics and electrical engineering, because of its good physical and chemical properties. Nevertheless, due to the flammability of common epoxy resin, it cannot meet the requirements of use in many fields. With the development of the epoxy resin industry in the direction of refinement, it has become a research hotspot to develop new and high-efficiency flame retardants to improve the flame retardancy of epoxy resins.

At present, with species diversity in epoxy resin flame retardant, practice of classification is also different. According to the elements contained in flame retardant, it can be classified into phosphorus, nitrogen, silicon, fluorine or synergistic flame retardant containing two or more elements. The retardant can be further subdivided into an additive type and a reactive type based on whether or not it has a functional group capable of reacting with epoxy resin. The reactive flame retardant has a long-lasting flame retardant effect, does not migrate in the epoxy resin, and can maintain or improve its mechanical properties while improving the flame retardancy of the epoxy resin.

Gao et al. (Gao L P, Wang D Y, Wang Y Z, et al. Polymer Degradation and Stability, 2008, 93(7): 1308-1315.) synthesized a kind of phosphorus-containing monomer DODPP with a single reactive functional group, and then DODPP in different proportions reacted with DGEBA, obtaining the epoxy resin with different phosphorus content. When the phosphorus content was 2.5%, the cured product could reach UL-94 V-0 rating and 30.2% limiting oxygen index (LOI). The values of HRR, PHRR and Av-HRR obtained by heat release test all decreased. Murias (Murias P, Maciejewski H, Galina H. European Polymer Journal, 2012, 48(4): 769-773.) synthesized two kinds of siloxanes with a terminal amino group or an epoxy group, with triethylenetetramine as curing agent and co-cured with a low molecular weight epoxy (E6) to obtain an epoxy cured product. When the amount of siloxane added was increased, the LOI value of the obtained epoxy cured product was also increased from 21.9% up to 23.9%, and the impact strength was significantly improved.

SUMMARY OF THE INVENTION

The invention relates to a phosphaphenanthrene-structure reactive flame retardant and application thereof.

The phosphaphenanthrene-structure reactive flame retardant is prepared by the reaction of bis[tetrakis(hydroxymethyl)phosphonium] sulfate (THPS), aniline, glacial acetic acid, p-hydroxybenzaldehyde (4-HBA) and 9,10-dihydro-9-oxa-10-phosphaphenanthrene-10-oxide (DOPO).

The phosphaphenanthrene-structure reactive flame retardant structure is as follows:

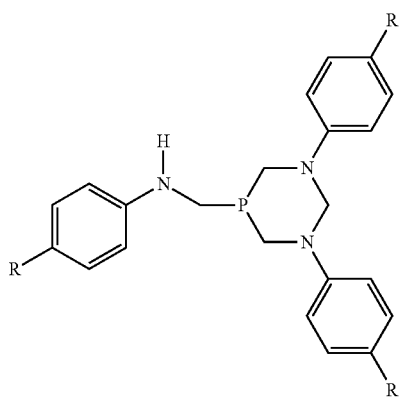

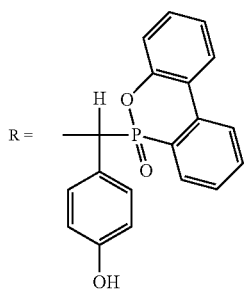

The synthesis route of the phosphaphenanthrene-structure reactive flame retardant is as follows:

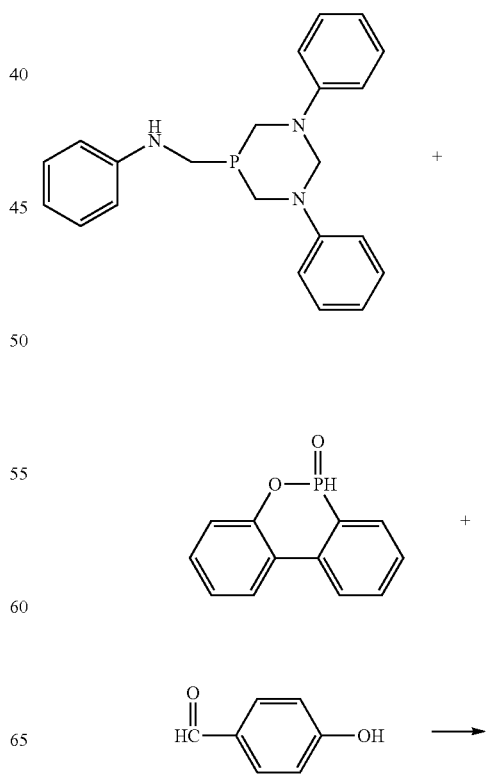

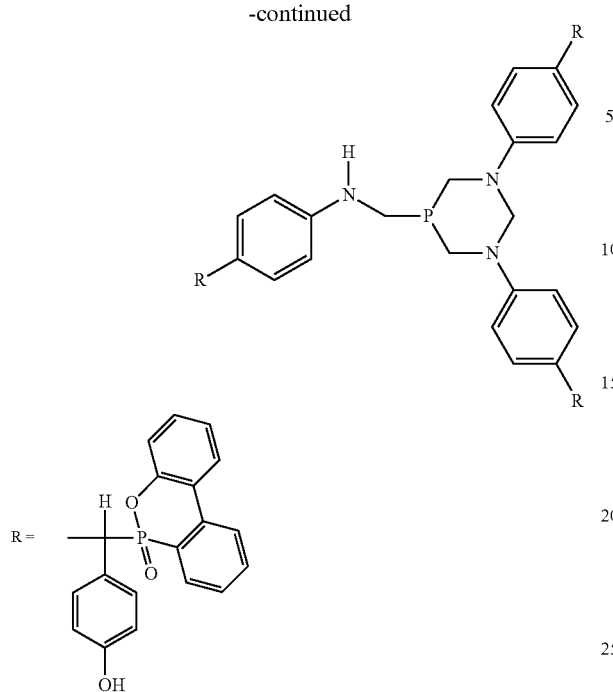

The synthesis steps of the phosphaphenanthrene-structure reactive flame retardant are as follows:

(1) the method for synthesizing 5-aminomethyl-1,3-diphenyl-1,3,5-diphosphonitryl heterocycle (hereinafter referred to as substance I) is according to Frank A Drake Jr G L. *The Journal of Organic Chemistry*, 1972, 37(17): 2752-2755;

(2) DOPO, 4-HBA and substance I are added to a three-necked bottle, a catalytic amount of p-toluene sulfonic acid is added, protected with nitrogen, heated up and magnetically stirred, and react for a certain period of time;

(3) column chromatography with silica gel as stationary phase is used for separation after the reaction is completed.

Wherein the molar ratio of the substance I, 4-hydroxybenzaldehyde and DOPO is 1:2-6:3-7;

the use amount of the catalyst p-toluene sulfonic acid is 1%-10% of the mass fraction of substance I;

the solvent is toluene, the reaction temperature is 100-180° C., the reaction time is 8-20 h.

The preparation method for the reactive flames retardant with multifunctional groups, is composed of the following steps:

1. the molar ratio of DOPO, 4-HBA and substance I in step (2) can be 4: 3: 1-6: 5: 1, the use amount of the catalyst p-toluene sulfonic acid is 2%-8% of the mass fraction of substance I; the reaction temperature is from 120° C. to 160° C., and the reaction time is from 10 to 16 hours;

2. the eluent for the column chromatography in the step (3) is ethyl acetate:petroleum ether=4:1 (volume ratio), and 5 mL of glacial acetic acid is added to per 100 mL of the eluent.

The flame retardant of the present invention has the following advantages:

(1) The molecular structure of the flame retardant contains three hydroxyl groups, which can react with the epoxy group and participate in the curing of the epoxy resin. Compared with the common reactive flame retardant, it has more functional groups and exhibits more firmly bond to the matrix after modifying the epoxy resin (2) The molecular structure of the flame retardant has a plurality of benzene rings and dense rings, and the phosphorus, carbon and nitrogen atoms form a six-membered heterocycle. Therefore, it has higher thermal stability and hydrolysis resistance.

(3) The relative molecular weight of the flame retardant is 1321. Compared to small molecule flame retardants, it can be better present in epoxy resins without migration.

DRAWINGS

DETAILED DESCRIPTION

The present invention is further described below by means specific embodiments.

Embodiment 1

2.16 g (0.01 mol) of DOPO, 0.732 g (0.006 mol) of 4-HBA, 0.722 g (0.002 mol) of substance I were added in a three-neck flask respectively, 0.0864 g (the mass fraction relative to substance I is 4%) of p-toluene sulphonic acid was added, protected by nitrogen, heated to 130° C., and magnetically stirred for 12 h. After completion of the reaction, silica gel was used as stationary phase, ethyl acetate:petroleum ether=4:1 as eluent, 5 mL of glacial acetic acid was added to every 100 mL of the eluent, and the product was separated by column chromatography.

Figure 1:
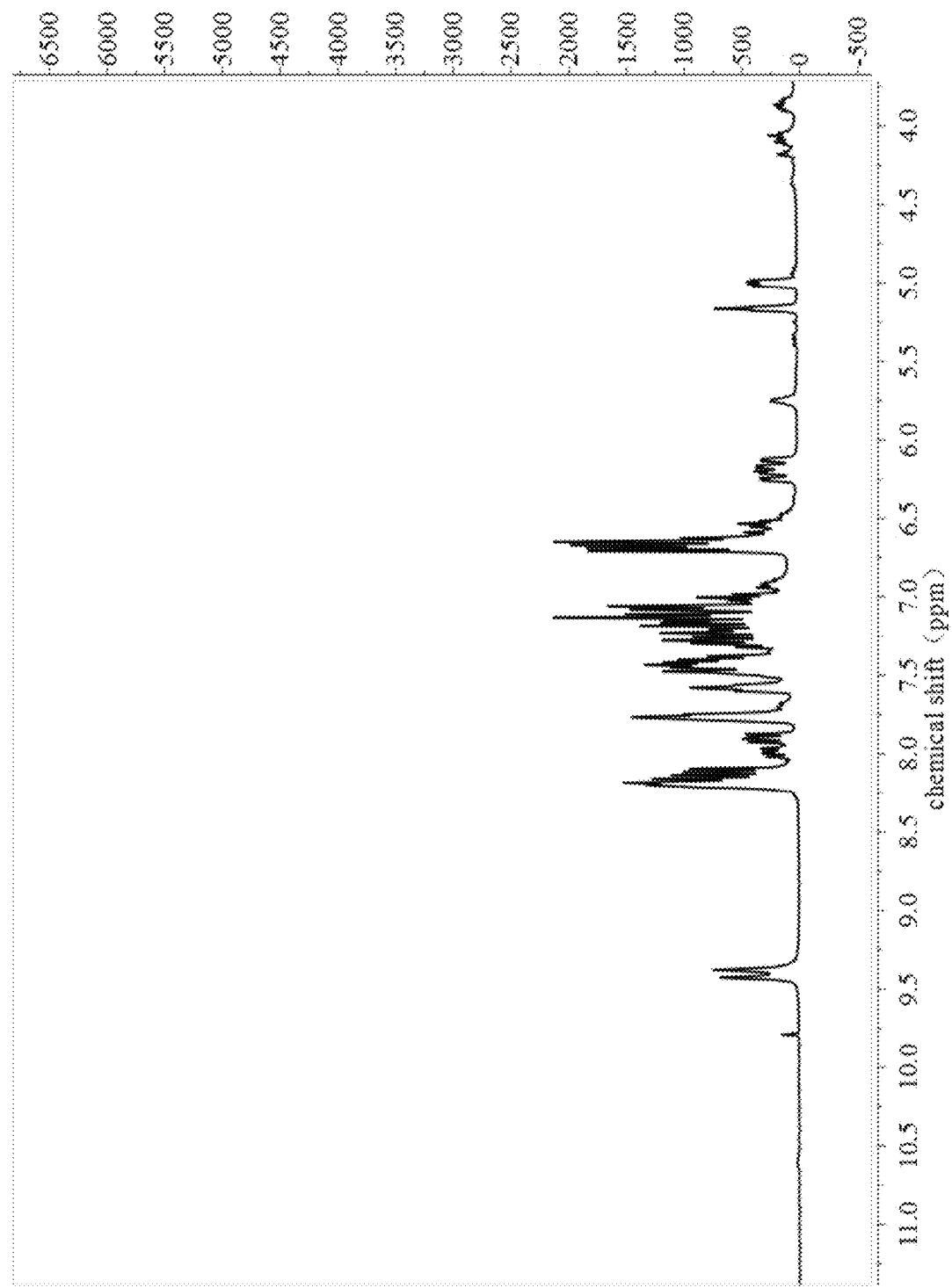
FIG. 1 shows the nuclear magnetic hydrogen spectrum of the flame retardant in embodiment 1.
Figure 2:
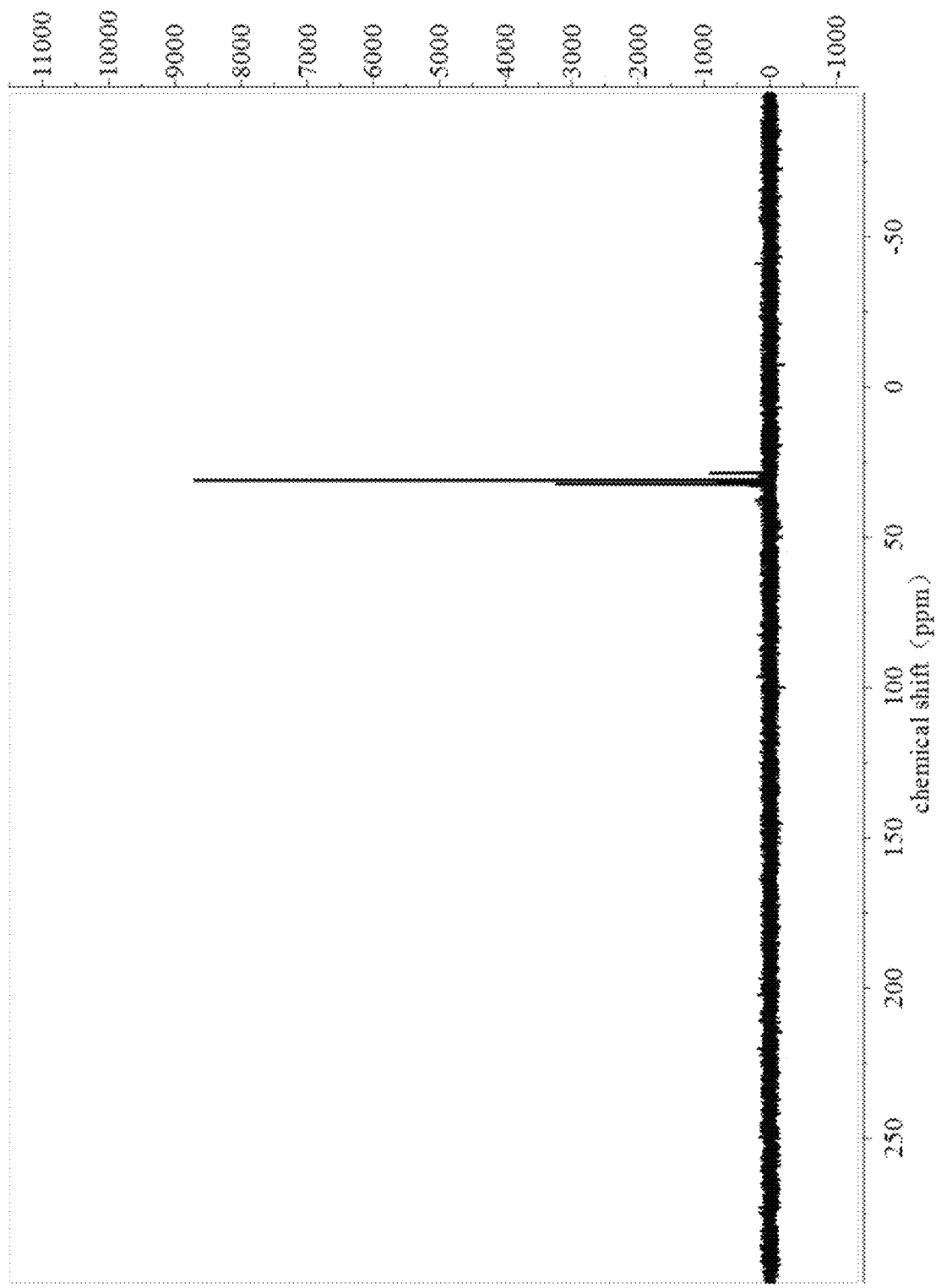
FIG. 2 shows the nuclear magnetic phosphorus spectrum of the flame retardant in embodiment 1.

The NMR spectra were shown in FIG. 1 and FIG. 2.

Embodiment 2

2.592 g (0.012 mol) of DOPO, 0.732 g (0.006 mol) of 4-HBA, 0.722 g (0.002 mol) of substance I were added in a three-neck flask respectively, 0.0864 g (the mass fraction relative to substance I is 4%) of p-toluene sulphonic acid was added, protected by nitrogen, heated to 130° C., and magnetically stirred for 16 h.

After completion of the reaction, silica gel was used as stationary phase, ethyl acetate:petroleum ether=4:1 as eluent, 5 mL of glacial acetic acid was added to every 100 mL of the eluent, and the product was separated by column chromatography.

Embodiment 3

2.592 g (0.012 mol) of DOPO, 0.976 g (0.008 mol) of 4-HBA, 0.722 g (0.002 mol) of substance I were added in a three-neck flask respectively, 0.0864 g (the mass fraction relative to substance I is 4%) of p-toluene sulphonic acid was added, protected by nitrogen, heated to 130° C., and magnetically stirred for 16 h. After completion of the reaction, silica gel was used as stationary phase, ethyl acetate:petroleum ether=4:1 as eluent, 5 ml of glacial acetic acid was added to every 100 mL of the eluent, and the product was separated by column chromatography.

Embodiment 4

2.592 g (0.012 mol) of DOPO, 0.732 g (0.006 mol) of 4-HBA, 0.722 g (0.002 mol) of substance I were added in a three-neck flask respectively, 0.0864 g (the mass fraction relative to substance I is 4%) of p-toluene sulphonic acid was added, protected by nitrogen, heated to 130° C., and magnetically stirred for 16 h. After completion of the reaction, silica gel was used as stationary phase, ethyl acetate:petroleum ether=4:1 as eluent, 5 mL of glacial acetic acid was added to every 100 mL of the eluent, and the product was separated by column chromatography.

The preparation of the pure epoxy resin and modified epoxy resin with the flame retardant, and the procedures of the fire retardant tests were as follows:

(1) Preparation of Pure Epoxy Resin 20 g of epoxy resin E-51 was taken, heated to 100° C., 4 g of curing agent 4,4'-diaminodiphenylmethane was added, stirred well, poured into a mould, heated at 120° C. for 4 h, then kept at 140° C. for 2 h, and finally kept at 160° C. for 2 h.

(2) Preparation of Reactive Flame Retardant-Modified Epoxy Resin 20 g of epoxy resin E-51 was taken, heated up to 100° C., 2.13 g of the flame retardant (the mass of the phosphorus element was 1% of the mass of the epoxy resin, the following addition amount of flame retardant was based on the mass of phosphorus element), after stirred and dissolved, the small molecular substance were removed under vacuum, 4 g of curing agent 4,4'-diaminodiphenylmethane was added, stirred well, poured into the mould, kept at 120° C. for 4 h, then kept at 140° C. for 2 h, finally, kept it at 160° C. for 2 h, and the reactive flame retardant-modified epoxy resin was obtained. According to this method, modified epoxy resin was prepared by adding 6.39 g and 10.66 g of the flame retardant (corresponding phosphorus content was 3% and 5% respectively) to 20 g of epoxy resin respectively.

(3) The limiting oxygen index of the obtained sample was tested according to the method of GB/T 2406.2-2009.

The results of the limiting oxygen index test were shown in Table 1.

TABLE 1

The results of the limiting oxygen index for the epoxy resins modified with different content of phosphorus

| Phosphorus content | Control group | 1% | 3% | 5% |
|---|---|---|---|---|
| Oxygen index (LOI) | 26.3 | 32.2 | 36.2 | 38.4 |

As mentioned above, these are only preferred embodiments of the present invention, so the scope of implementation of the present invention cannot be limited accordingly. That is, the equivalent changes and modifications made according to the patent scope and description content of the present invention should still be within the scope of the present invention.

The invention claimed is:

1. A preparation method of the phosphaphenanthrene-structure reactive flame retardant,

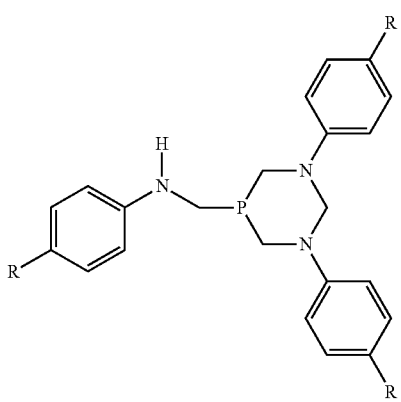

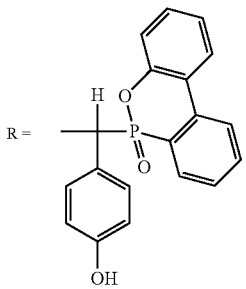

comprising the steps:
under the protection of nitrogen, the reactant 5-aminomethyl-1,3-diphenyl-1,3,5-diphosphonitryl heterocycle, 4-hydroxybenzaldehyde, DOPO and solvent are sequentially added to a vessel, and then p-toluene sulfonic acid is added as a catalyst, the mixture is heated and reacted for a period of time, a pale yellow solution is obtained, the solvent is removed by concentration, and the crude product is separated by column chromatography to obtain the phosphaphenanthrene-structure reactive flame retardant; wherein,
the molar ratio of the 5-aminomethyl-1,3-diphenyl-1,3,5-diphosphonitryl heterocycle, 4-hydroxybenzaldehyde, DOPO is 1:2-6:3-7;
the amount of the catalyst p-toluene sulfonic acid is 1%-10% of the mass fraction of the 5-aminomethyl-1,3-diphenyl-1,3,5-diazophosphorus heterocycle;
the solvent is toluene, the reaction temperature is 100-180° C., and the reaction time is 8-20 h.

2. The preparation method of the phosphaphenanthrene-structure reactive flame retardant according to claim 1, wherein the molar ratio of the 5-aminomethyl-1,3-diphenyl-1,3,5-diphosphonitryl heterocycle, 4-hydroxybenzaldehyde, and DOPO is 1: 3-5: 4-6.

3. The preparation method of the phosphaphenanthrene-structure reactive flame retardant according to claim 1, wherein the amount of the catalyst p-toluene sulfonic acid is 2%-8% of the mass fraction of the 5-aminomethyl-1,3-diphenyl-1,3,5-diazophosphorus heterocycle.

4. The preparation method of the phosphaphenanthrene-structure reactive flame retardant according to claim 3, wherein the solvent is toluene, the reaction temperature is 120-160° C., and the reaction time is 10-16 h.

5. The preparation method of the phosphaphenanthrene-structure reactive flame retardant according to claim 1, wherein the column chromatography is performed by using 300-400 mesh silica gel as the stationary phase, ethyl acetate: petroleum ether volume ratio =4:1 as the mobile phase, and 5 ml of glacial acetic acid is added to every 100 mL of the eluent.

6. A preparation method of flame retardant polymer material, comprising the following steps: epoxy resin prepolymer is heated to a certain temperature, stirred, a certain mass fraction of the phosphaphenanthrene-structure reactive flame retardant according to claim 1 is added, stirred until the mixture is uniformily transparent, then, a curing agent is added by stoichiometric ratio, poured into an aluminum mould after the curing agent is completely dissolved, then a curing procedure is set to cure the mixture, and the flame retardant epoxy resin is obtained.

7. The preparation method of flame retardant polymer material according to claim 6, wherein epoxy resin prepolymer is heated to 85-100° C., stirred for 20-40 min; the mass fraction of the phosphaphenanthrene-structure reactive flame retardant added is 1-30%, and continue to be stirred for 40-80 min; the curing procedure is at 120-130° C. for 4 h, continue to be kept at 130-150° C. for 2 h, and finally kept at 150-170° C. for 2 h.

* * * * *